(12) United States Patent
McDonough

(10) Patent No.: US 6,278,942 B1
(45) Date of Patent: Aug. 21, 2001

(54) METHOD AND SYSTEM FOR PROVIDING ROUTING GUIDANCE

(75) Inventor: William McDonough, Glen Ellyn, IL (US)

(73) Assignee: Navigation Technologies Corp., Rosemont, IL (US)

( * ) Notice: Subject to any disclaimer, the term of this patent is extended or adjusted under 35 U.S.C. 154(b) by 0 days.

(21) Appl. No.: 09/531,574

(22) Filed: Mar. 21, 2000

(51) Int. Cl.[7] ............................................. G06F 165/00
(52) U.S. Cl. ........................ 701/210; 701/201; 701/202; 701/209
(58) Field of Search ..................................... 701/209, 210, 701/202, 207, 208, 211, 200, 201; 340/990, 988, 995

(56) References Cited

U.S. PATENT DOCUMENTS

| | | | |
|---|---|---|---|
| 5,311,434 | * 5/1994 | Tamai | 701/210 |
| 5,371,678 | * 12/1994 | Nomura | 701/210 |
| 5,774,073 | * 6/1998 | Maekawa et al. | 340/995 |
| 5,902,349 | 5/1999 | Endo et al. | 701/202 |
| 5,911,775 | 6/1999 | Tanimoto | 701/210 |
| 5,928,307 | 7/1999 | Oshizawa et al. | 701/210 |
| 6,026,346 | 2/2000 | Ohashi et al. | 701/210 |
| 6,038,509 | 3/2000 | Poppen et al. | 701/210 |
| 6,134,501 | * 10/2000 | Oumi | 701/209 |

* cited by examiner

Primary Examiner—William A. Cuchlinski, Jr.
Assistant Examiner—Marthe Marc-Coleman
(74) Attorney, Agent, or Firm—Frank J. Kozak; Lawrence M. Kaplan

(57) ABSTRACT

A method performed by a navigation system to provide guidance to a driver of a vehicle when the vehicle departs from a route to a destination for which route guidance was being provided by the navigation system. Intersections that can be reached by the vehicle while calculation of a new solution route to the destination is being performed are identified. For each identified intersection, cost factors associated with the possible paths leading from the identified intersection are modified to increase the likelihood that the new solution route include those paths with the least cost factors.

19 Claims, 7 Drawing Sheets

ACTUAL INTERSECTION

DATA REPRESENTATION

DATA RECORD REPRESENTATION

FIG. 6A
ACTUAL INTERSECTION
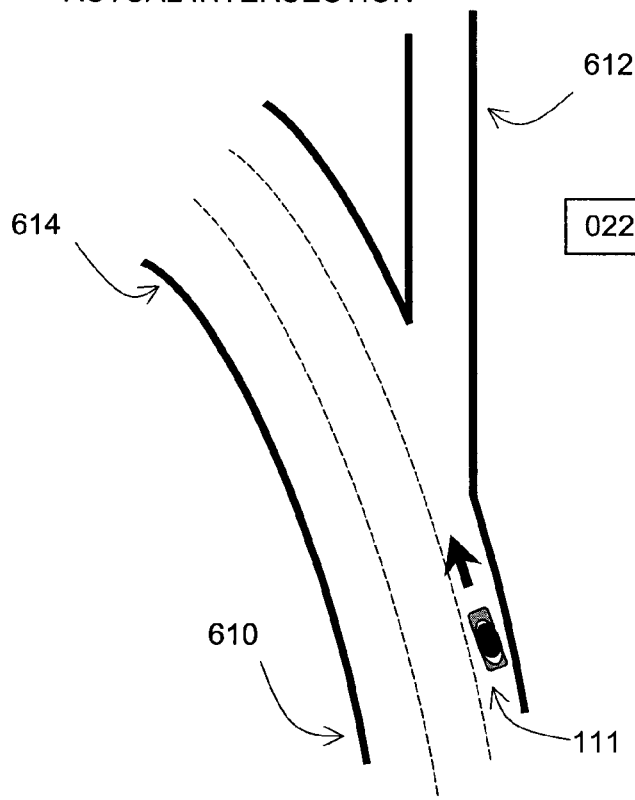
FIG. 6B
DATA REPRESENTATION
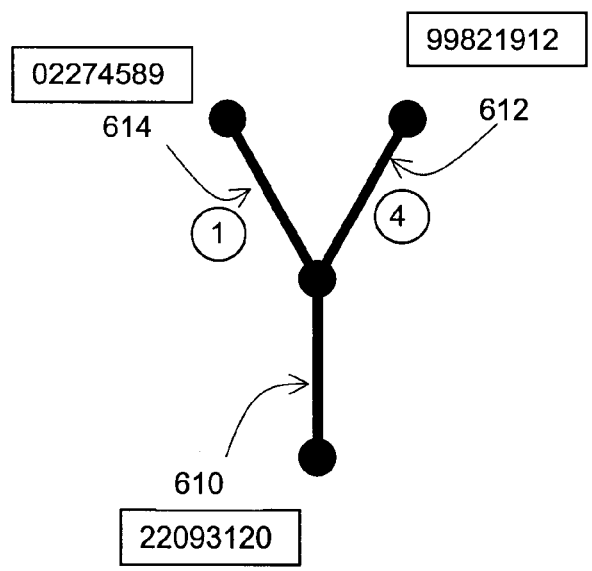
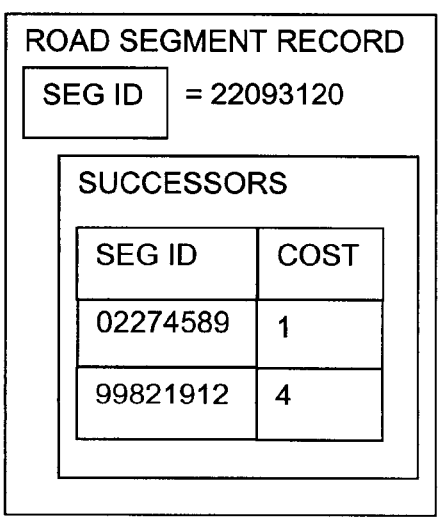
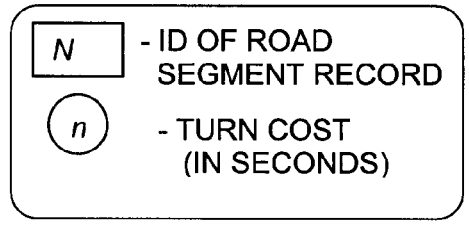
FIG. 6C
DATA RECORD REPRESENTATION

ACTUAL INTERSECTION

DATA REPRESENTATION

DATA RECORD REPRESENTATION

METHOD AND SYSTEM FOR PROVIDING ROUTING GUIDANCE

BACKGROUND OF THE INVENTION

The present invention relates to navigation systems and more particularly the present invention relates to providing guidance when a driver deviates from a route for which route guidance was previously being provided a navigation system.

Navigation systems provide useful features, such as calculating a route to a desired destination and providing guidance for following the route. In order to provide these features, navigation systems use geographic data that include information about the locations of roads and intersections, estimated travel times along road segments, the speed limits along roads, etc. Using these kinds of geographic data, programming algorithms included in navigation systems can find an optimal (e.g, fastest or shortest) route to a specified destination.

Some navigation systems provide a feature that can detect if a vehicle has departed from a route for which route guidance was being provided (i.e., when the vehicle has gone "off-route"). Upon detecting that the vehicle has gone off-route, the navigation system calculates a new route to either the destination or back to the original route and provides guidance to the vehicle driver for following the new route. A factor that can complicate providing this feature is that the calculation of the new route may take several seconds during which time the vehicle position may change. Therefore, the point of origin from which the new route was calculated may not be valid several seconds later when the guidance for following the new route is available for the driver. Worse still, the vehicle driver may have encountered an intersection before the route guidance for following the new route was available and chosen a path leading from the intersection that was not part of the new route. If this occurs, the vehicle is off-route of the new route when the new route becomes available thereby necessitating calculation of another new route from the vehicle position to either the destination or back to the original route.

Accordingly, there exists a need in a navigation system to provide route guidance to a user when the vehicle in the navigation system goes off-route.

SUMMARY OF THE INVENTION

To address these and other objectives, the present invention comprises a method performed by a navigation system to provide guidance to a driver of a vehicle when the vehicle departs from a route to a destination for which route guidance was being provided by the navigation system. Intersections that can be reached by the vehicle while calculation of a new solution route to the destination is being performed are identified. For each identified intersection, cost factors associated with the possible paths leading from the identified intersection are modified to increase the likelihood that the new solution route include those paths with the least cost factors.

BRIEF DESCRIPTION OF THE DRAWINGS

FIG. 5A is used in a first example describing operation of the off-route application of FIG. 4.

FIG. 6A depicts the vehicle of FIG. 1 approaching an exit ramp. FIG. 6A is used in a second example describing operation of the off-route application of FIG. 4.

FIG. 6B is a graphical representation of the controlled access road and exit ramp shown in FIG. 6A.

FIG. 6C shows how the turn costs of the controlled access road and exit ramp of FIG. 6A are represented in the geographic database of FIG. 2.

FIG. 7A is used in a third example describing operation of the off-route application of FIG. 4.

DETAILED DESCRIPTION OF THE PRESENTLY PREFERRED EMBODIMENTS

I. Exemplary Navigation System Platform

A. Overview

Figure 1:
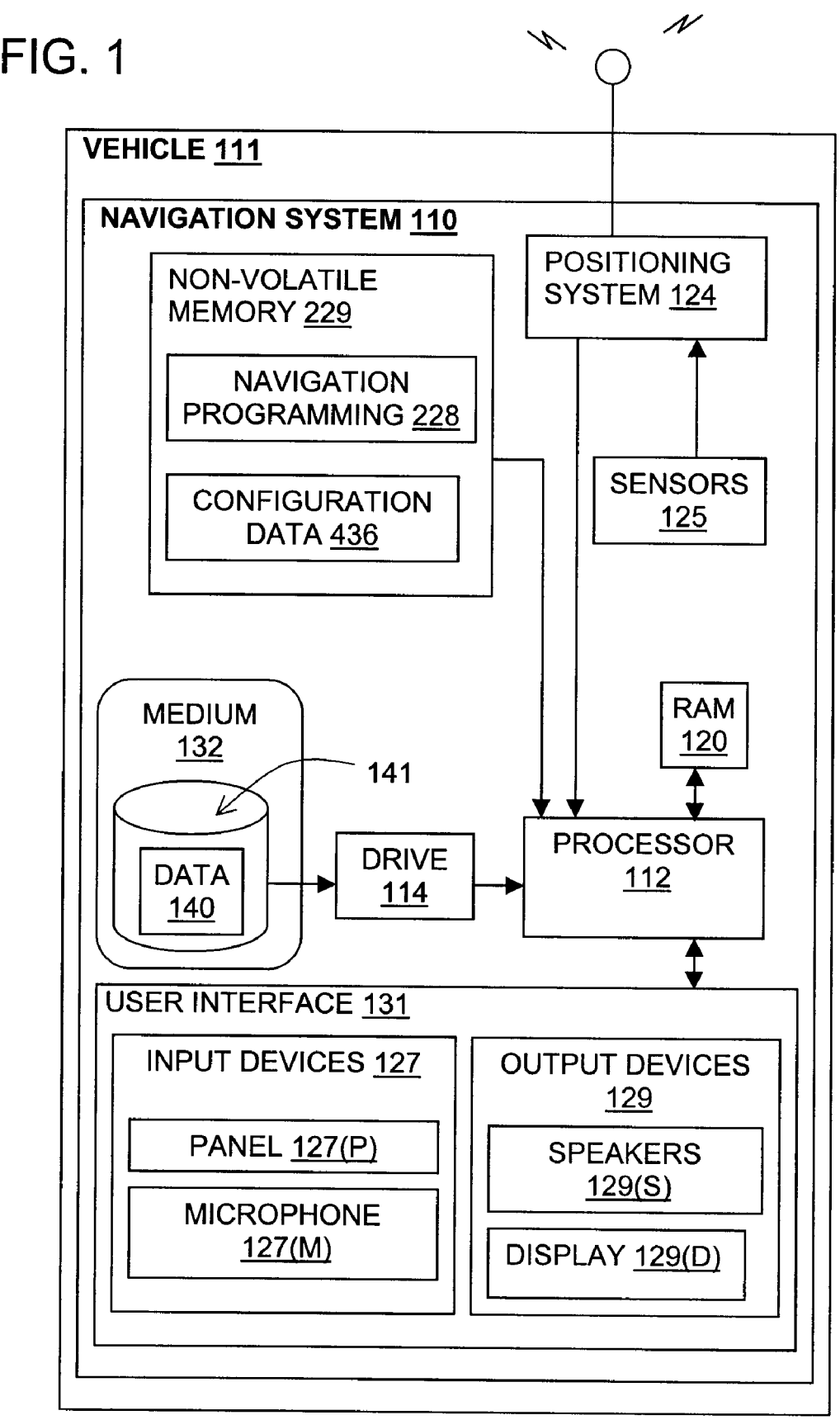
FIG. 1 is a block diagram illustrating a navigation system.

Referring to FIG. 1, there is a diagram illustrating an exemplary embodiment of a navigation system 110. In the embodiment shown in FIG. 1, the navigation system 110 is located in a vehicle 111, such as an automobile, truck, or bus. The navigation system 110 is a combination of hardware and software components. The hardware components of the navigation system 110 may include a processor 112, memory 120, and so on. In the embodiment of FIG. 1, the navigation system 110 also includes a positioning system 124 that determines the position of the vehicle 111 in which it is installed. The positioning system 124 may include sensors 125 or other components that sense the speed, orientation, direction, angular acceleration, and so on, of the vehicle 111. The positioning system 124 may also include a GPS system.

The navigation system 110 also includes a user interface 131. The user interface 131 includes appropriate means 127 for receiving instructions and/or input from an end user of the navigation system. The instruction receiving means 127 may include a keyboard, keypad, or other type of input panel 127(P), a microphone 127(M), as well as other means for accepting end-user input, such as voice recognition software, and so on, through which the end user may request navigation information and services. The user interface 131 also includes appropriate means 129 for providing information back to the end user. The information providing means 129 may include a display 129(D) and speakers 129(S) (including speech synthesis hardware and software) through which the end user can be provided with information and services from the navigation system 110.

All of the components described above may be conventional (or other than conventional) and the manufacture and use of these components are known to those of skill in the art

B. The geographic database

In order to provide navigation features to an end user, the navigation system 110 uses geographic data 140. The geographic data 140 include information about one or more geographic regions or coverage areas. The geographic data 140 may be stored in the vehicle 111 or alternatively, the geographic data 140 may be stored remotely and made available to the navigation system 110 in the vehicle 111 through a wireless communication system which may be part of the navigation system 110. In another alternative, a portion of the geographic data 140 may be stored in the vehicle 111 and a portion of the geographic data 140 may be stored in a remote location and made available to the navigation system 110 in the vehicle 111 over a wireless communication system from the remote location.

In the embodiment shown in FIG. 1, some or all of the geographic data 140 are stored on a medium 132 which is located in the vehicle 111. Accordingly, the navigation system 110 includes a drive 114 (or other suitable peripheral device) into which the medium 132 can be installed and accessed. In one embodiment, the storage medium 132 is a CD-ROM disk. In another alternative embodiment, the storage medium 132 may be a PCMCIA card in which case the drive 114 would be substituted with a PCMCIA slot. Various other storage media may be used, including fixed or hard disks, DVD disks or other currently available storage media, as well as storage media that may be developed in the future.

The geographic data 140 include data specifying the positions of the roads in the covered geographic region(s). The geographic data 140 also include data relating to the roads, such as restrictions on directions of travel along the roads (e.g., one-way streets), street addresses along the roads, street names, speed limits along the roads, turn restrictions at intersections, and so on. The geographic data 140 may also include information about points of interest in the geographic area, such as hotels, restaurants, museums, stadiums, offices, automobile dealerships, auto repair shops, etc. The geographic data 140 may also include information about places, such as cities, towns, or other communities. The geographic data 140 may include other kinds of data about the geographic area.

The geographic data 140 may take a variety of different forms. In one embodiment, the geographic data 140 are in the form of one or more computer-readable data files or databases 141. Methods for forming and organizing a geographic database are disclosed in U.S. Pat. Nos. 5,953,722 and 5,974,419 and 5,968,109, the disclosures of which are incorporated herein by reference. In one embodiment, the geographic database 141 contains a plurality of road segment data records. Each road segment data record represents a portion (or segment) of a navigable road in the geographic region. In one type of geographic database, there is at least one database entry (also referred to as "entity" or "record") for each represented road segment in a geographic region. Each physical road segment has two nodes associated with it, one at each of the endpoints of the road segment. In this embodiment, the geographic database also includes a plurality of data entities that represent these nodes. (The terms "segment" and "node" represent only one terminology for describing these physical geographic features and other terminology for these features is intended to be encompassed within the scope of these concepts.)

Data attributes are associated with each road segment data record to describe features or characteristics of the represented road segment. The various attributes associated with a road segment may be included in a single road segment record, or may be included in more than one type of record which are cross-referenced to each other.

Figure 2:
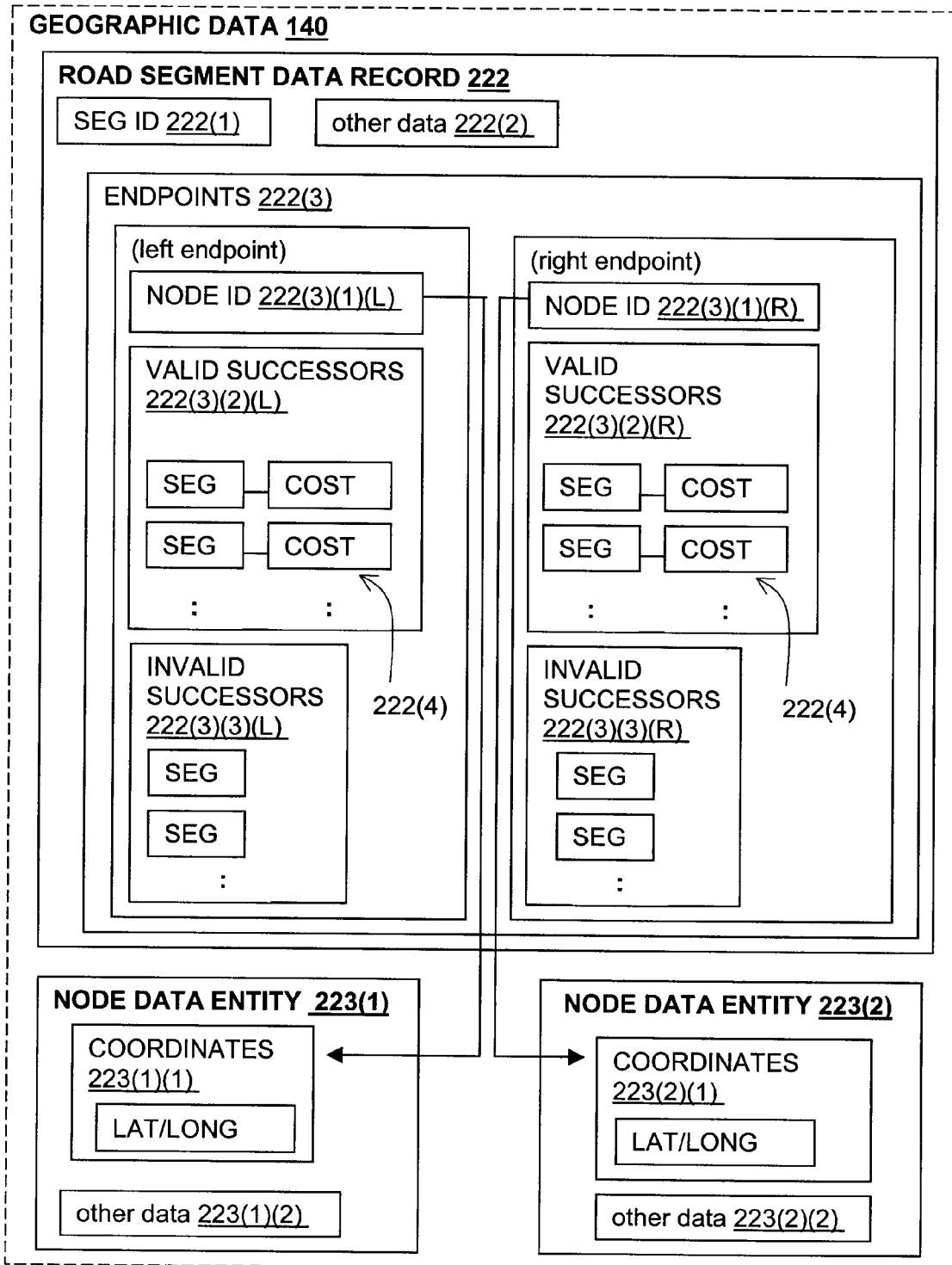
FIG. 2 is a block diagram illustrating components of a road segment data record included in the geographic database of FIG. 1.

FIG. 2 illustrates some of the components of a road segment data record 222 included in the geographic database 141. The road segment data record 222 includes a segment ID 222(1) by which the record can be identified in the geographic database. The road segment data record 222 includes data fields 222(2) for various attributes of the represented road segment. These attributes include the speed limit along the road (or a speed limit range), the type of road (e.g., controlled access, ramp, bridge, tunnel, toll road, ferry, and so on), a functional rank, a permitted direction of travel, an address range, a name, a highway designation of the road of which the road segment is a part, and so on.

The road segment data record 222 includes data 222(3) identifying the endpoints of the road segment. In one embodiment, these data 222(3) include references 222(3)(1)(L) and 222(3)(1)(R) to node data records 223(1) and 223(2) defined for the nodes corresponding to the endpoints of the represented road segment.

Also associated with the road segment data record 222 are data 222(3)(2)(L) and 222(3)(2)(R) indicating valid successor segments (if any) at each of the endpoints of the represented road segment. A valid successor segment is a road segment to which vehicular travel is legally permitted from the represented road segment. Also associated with the road segment data record 222 are data 222(3)(3)(L) and 222(3)(3)(R) indicating invalid successor segments (if any) at each of the endpoints of the represented road segment. An invalid successor segment is a road segment to which vehicular travel is not legally permitted from the represented road segment.

Associated with the data indicating each identified successor segment are data 222(4) indicating a turn cost. The turn cost data 222(4) indicate a cost associated with travel from the represented segment onto the successor segment via the common node (intersection) connecting the represented segment and the successor segment. The turn cost data 222(4) are used by functions in the navigation system (e.g., the route calculation function 250 in FIG. 3) to evaluate and compare different possible travel paths in order to ascertain which travel path takes the least time. In the embodiment of FIG. 2, the turn cost data 222(4) represent an estimate of the actual travel time it take to traverse the intersection between a represented segment and a successor segment. For example, if the successor segment is reached by a left turn from the represented segment at the common node, the turn cost data 222(4) represent an estimation of the time (in seconds) it takes to make the left turn from the represented segment onto to the successor segment.

The turn cost data 222(4) are used to represent the time it takes to travel onto a successor segment even if no turn is required to reach the successor segment. For example, if a successor segment is reached from the represented segment by traveling straight ahead across the common intersection, the turn cost data 222(4) represent the cost (e.g., travel time) to cross straight ahead across the intersection. The turn cost data 222(4) can also be used to represent invalid successor segments. Invalid successor segments have an infinite (or very high) travel cost value.

In one embodiment, the geographic data are provided by Navigation Technologies Corporation of Rosemont, Ill. However it is understood that the inventive concepts disclosed herein are not restricted to any particular source of data.

C. The navigation programming.

Referring again to FIG. 1, in addition to the hardware components and geographic database, the navigation system 110 includes or uses navigation programming 228. The navigation programming 228 includes the software that provides for the functions and/or features performed by the navigation system 110. The navigation programming 228 uses the geographic data 140 in conjunction with input from the end user via the user interface 131, and possibly in conjunction with outputs from the positioning system 124, to provide various navigation-related features and/or functions.

The navigation programming 228 may be stored in a non-volatile storage medium 229 in the navigation system 110. Alternatively, the navigation programming 228 and the geographic data 140 may be stored together on a single storage device or medium. Alternatively, the navigation programming 228 may be located at a remote location and may be provided to or accessed by the navigation system 110 over a communications system.

In one embodiment, the navigation programming 228 is written in the C programming language although in alternative embodiments other programming languages may be used, such as C++, Java, Visual Basic, and so on.

Figure 3:
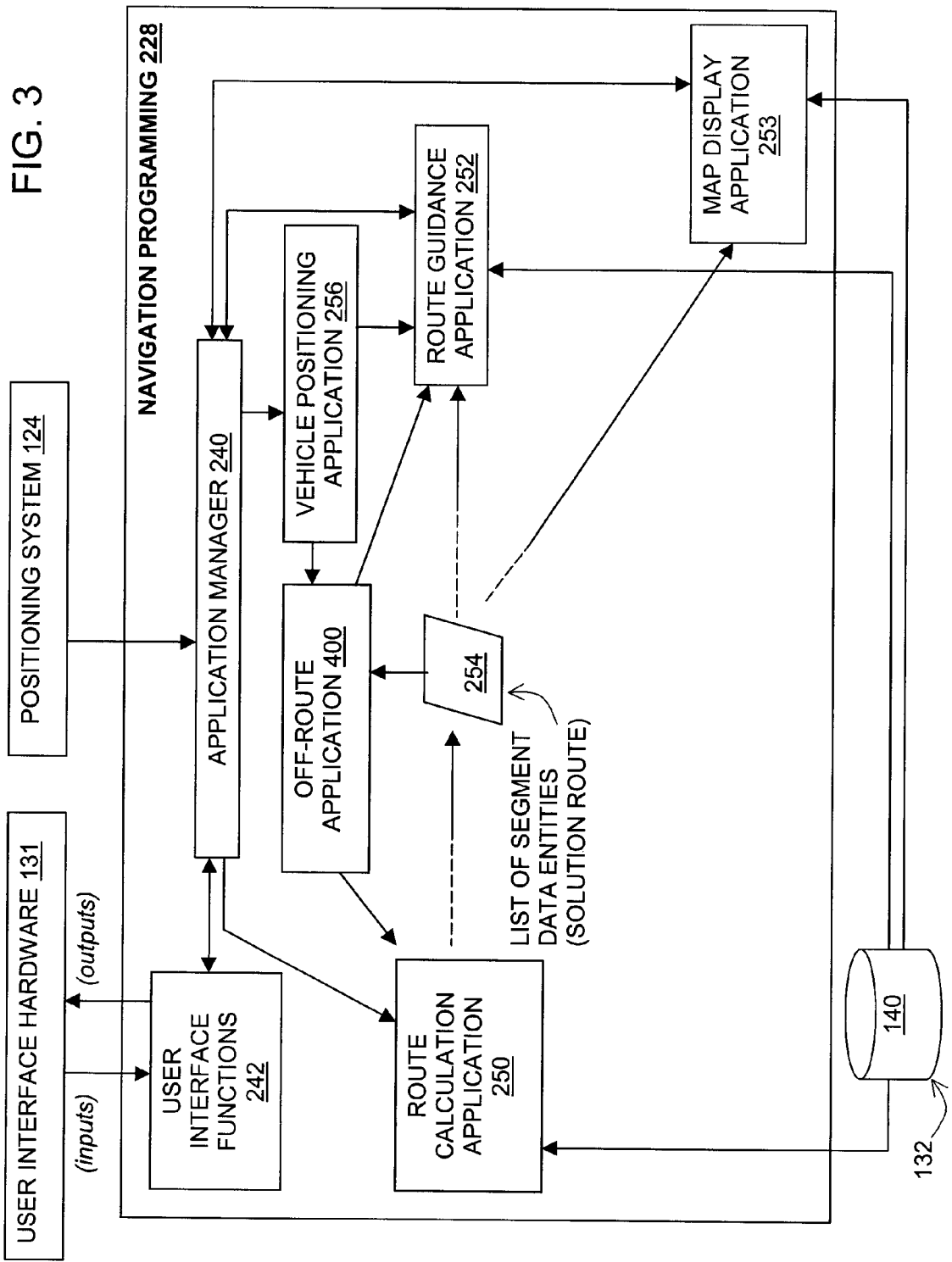
FIG. 3 is a block diagram illustrating components of the navigation programming shown in FIG. 1.

The navigation programming 228 may be formed of separate component applications (also referred to as programs, subprograms, routines, or tools). The component applications of the navigation programming 228 work together through defined programming interfaces. FIG. 3 shows a block diagram illustrating some of the component applications for one embodiment of the navigation programming 228 included in the navigation system 110 of FIG. 1. In addition to the component programs shown in FIG. 3, the navigation programming 228 may include other component sub-routines or programs.

In FIG. 3, the navigation programming 228 is shown to include a navigation application manager 240. The navigation application manager 240 is a program or routine that provides for overall management of the functions of the navigation system 110. The navigation application manager 240 may also include support for and interfaces to the navigation system hardware, such as the positioning system 124 and the user interface 131. The navigation application manager 240 includes user interface functions 242 to interface with the user interface hardware 131. These user interface functions 242 may provide for presenting a menu to the end user on the screen display 129(D) of the user interface hardware 131, accepting inputs from the end user via the input devices 127 of the user interface hardware 131, displaying results to the end user on the screen display 129(D) of the user interface hardware 131, and so on.

The navigation programming 228 includes sub-programs or routines that interface with the navigation application manager 240 and that provide for specific navigation-related features or functions to be performed by the navigation system. These sub-programs include a route calculation application 250, a route guidance application 252, a map display application 253, and a vehicle positioning application 256. The navigation programming 228 may include other navigation applications in addition to these.

Example of operation of the navigation system.

The route calculation application 250 receives a request to calculate a route to a desired destination. The request may originate with the end user. The request is received via the user interface 131, the user interface functions 242 and the manager application 240. The request may be in the form of an identification of a starting location and a desired destination location. The identification of these locations may include the geographic coordinates of these locations. The route calculation application may also be provided with other data or parameters, such as driving preferences (e.g., avoid toll roads).

Given at least the identification of a starting location and a desired destination location, the route calculation application 250 attempts to determine one or more solution routes between the starting location and the destination location. A solution route is formed of a series of connected road segments over which a vehicle can travel from the starting location to the destination location. When the route calculation application 250 calculates a route, it accesses the geographic data 140 and obtains road segment data records 222 that represent road segments around and between the starting location and the destination location. The route calculation application 250 uses the information in the road segment data records 222 to attempt to determine at least one valid solution route from the starting location to the destination location. The route calculation application 250 may use various means or algorithms in determining solution routes. In determining a valid solution route for a vehicle to travel, the route calculation program 250 uses the data attributes associated with the road segment data records to account for direction of travel restrictions (e.g., one-way streets), turn restrictions at intersections (e.g., no left turns), and so on. The route calculation application 250 may attempt to find a solution route that takes the least time to travel, that covers the least distance, or that meets some other specifiable criteria.

The route calculation application 250 provides an output. In the embodiment of FIG. 3, the output of the route calculation application 250 is in the form of an ordered list 254 identifying a plurality of road segments. The plurality of road segments form the continuous navigable route between the origin and the destination that had been calculated by the route calculation application 250. (The route calculation application 250 may calculate more than one solution route.)

The list 254 of road segments determined by the route calculation application 250 is provided to the route guidance application 252. The route guidance application 252 uses the information in the list 254, as well as additional information from the geographic database 141, to provide instructions and advice to the end user to travel the route defined by the list 254 output by the route calculation application 250. The route guidance application 252 may include functions that identify locations along the calculated route at which maneuvering instructions may be provided to the end user. The route guidance application 252 may also include functions that formulate the maneuvering instructions for visual output and/or audio output. The route guidance application 252 may provide the maneuvering instructions all at once, or alternatively, the route guidance application 252 may provide the maneuvering instructions one at a time as the vehicle is traveling. In one embodiment, each maneuvering instruction is provided separately (or in small groups of combined maneuvering instructions) in advance of when the specific maneuver is required to be taken so that the end user can prepare to make the required maneuver.

In order to provide maneuvering instructions at appropriate times and/or locations, the navigation system 110 uses data from the positioning system 124. The positioning system 124 determines the position of the vehicle as it is traveling. The vehicle positioning application 256 in the navigation programming 228 compares the vehicle position determined by the positioning system 124 to the positions of the road segments in the solution driving route 254. Using this comparison, the maneuver instructions, which are related to positions along the solution route, can be provided at appropriates times as these positions are approached.

The list 254 of road segments from the route calculation application 250 may also be provided to the map display application 253. The map display application 253 uses the information in the list 254, as well as additional information from the geographic database 140, to provide graphical maps on the display (129(D) in FIG. 1) of the user interface 131. The graphical maps illustrate the areas through which the calculated route passes. The path of the calculated route may be highlighted on the displayed maps. The map display application 253 interfaces with the navigation application manager 240 so that the display maps are provided as the vehicle is traveling the calculated route. The navigation application manager 240 and the map display application 253 may receive the outputs from the positioning system 124 and the map-matching application 256 for this purpose.

Methods for route calculation are disclosed in U.S. Pat. No. 6,192,314, methods for providing route guidance are disclosed in U.S. Pat. Nos. 6,199,013 and 6,212,474, methods for providing vehicle positioning are disclosed in U.S. Pat. No. 6,192,312, and methods for providing map display are disclosed in U.S. Pat. Nos. 6,092,076 and 6,163,749. The disclosures of these six patents are incorporated by reference herein. The methods disclosed in these patents represent only some of the ways that these functions can be provided and the subject matter claimed herein is not limited to any particular method. Any suitable method now known or developed in the future may be employed.

II. Off-Route Detection and Guidance

Despite receiving driving instructions from the navigation system for following a calculated route to a destination, it sometimes occurs that the vehicle departs from the route for which route guidance was being provided. When this occurs, the navigation system detects that the vehicle has departed from the route and advises the driver that the vehicle is no longer following the calculated route. Also, if desired by the driver, the navigation system provides the driver with assistance to get back on a route to the destination. In a present embodiment, these features are provided by an off-route application 400. The off-route application 400 is included among the applications that are part of the software programming 228 of the navigation system 110. The off-route application 400 may be included as part of another application, such as the vehicle positioning application 256, the route calculation application 250, the route guidance application 252, or another application. Alternatively, the off-route application 400 may be a separate application.

Figure 4:
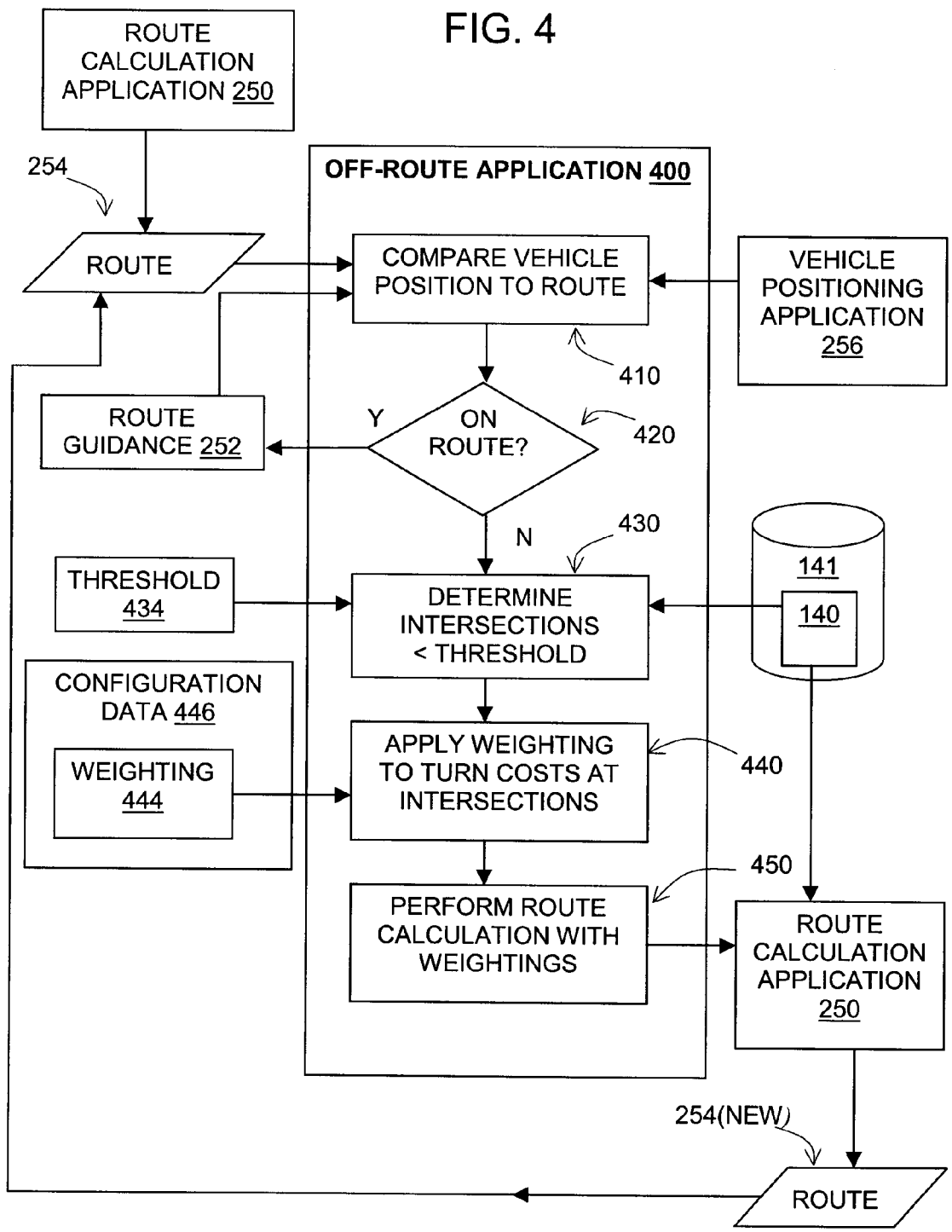
FIG. 4 is a flow chart showing steps performed by the off-route application of FIG. 3.

FIG. 4 show steps performed by the off-route application 400. In an initial step (Step 410), the off-route application 400 compares the current vehicle position to the route 254 calculated by the route calculation application 250. The current vehicle position is determined with respect to a position and direction along a segment represented by data 140 in the geographic database 141. This information can be obtained from the vehicle positioning application 256. The comparison step determines whether the vehicle is located on a segment that is part of the solution route 254 and whether the vehicle is traveling in the proper direction along the segment toward the destination. Based upon these determinations, a decision is made whether the vehicle is on the calculated route 254 (Step 420). If the vehicle is on the calculated route 254, the driver may be given route guidance, if appropriate, for performing an upcoming maneuver required to continue on the calculated route. This guidance may be determined by the route guidance application 244. After the appropriate guidance is provided, the process loops back to the step (Step 410) of comparing the current vehicle position to the calculated route 254.

If the vehicle is determined to be off route at step 420, a process of calculating a new route to the destination is started. First, the off-route application includes a step that determines all the intersections located within a threshold distance 434 of the current vehicle position (Step 430). The information about the locations of intersections is obtained from the geographic database 141. The threshold distance 434 is determined so as to encompass all the intersections that could be reached from the current vehicle position during the time it takes for the navigation system to calculate a new route to the destination from the current vehicle position. The threshold distance 434 may be specified using a fixed or configurable distance parameter which is stored as configuration data 436 in the non-volatile memory (229 in FIG. 1) of the navigation system 110. Alternatively, the threshold distance 434 may be calculated using the current vehicle speed and/or the speed limits of the roads located around the current vehicle position. If the threshold distance is calculated, an estimate of the amount of time needed to calculate a new route is used. This time estimate would vary depending upon the hardware platform and resources of the navigation system. This time estimate may be stored as a parameter in the configuration data (436 in FIG. 1). Using this time estimate, the distance that the vehicle could travel in the estimated amount of time given the speed limits of the roads around the vehicle is calculated and used as the threshold distance.

After the intersections located within the threshold distance 434 of the current vehicle position are determined, the off-route application 400 applies a weighting factor 444 to the turn costs at the identified intersections (Step 440). As described above, the geographic database 141 includes turn cost data 222(4) indicating an estimate of the amount of time it take to turn onto each successor segment from a represented road segment. The weighting factor 444 may be a fixed parameter. In one embodiment, the weighting factor is 10, although any arbitrarily large number will suffice. The weighting factor 444 may be stored with the configuration data 436.

After the weighting factor 444 is applied to all the turn costs of all the intersections located within the threshold distance 434 of the current vehicle position, a new route is calculated to the destination (Step 450). The new route is calculated using the route calculation application 250. The new route is calculated using the current vehicle position as the new origin and the prior destination as the new destination.

When the route calculation application 250 calculates a new route to the destination, it uses the weighted turn costs for those intersections to which the weightings were applied, i.e., those within the threshold distance. As stated above, the weightings are applied by multiplying the actual turn cost in the database by a weighting factor. This has the effect of amplifying the relative differences between the different turn costs at an intersection. Therefore, when the route calculation application 250 determines a new solution route to the destination from the current vehicle position, the turn with the least cost will almost always become part of the new solution route. For example, if the turn costs of the successor segments at an intersection are specified in the geographic database as "4 seconds", "1 second", and "2 seconds", after application of the weighting factor (e.g., 10), the turn costs are "40 seconds", "10 seconds", and "20 seconds", respectively. Therefore, whereas the successor segment having the turn cost of "1 second" was only slightly favored prior to application of the weighting factor (e.g., "1 second" versus "2 seconds"), after the application of the weighting factor, the successor segment having the turn cost of "1 second" is considerably more favored ("20 seconds" versus "10 seconds"). This method provides a means to predict where the vehicle will be when the calculation of the new solution route is completed. The successor segment with the least cost is the easiest for the user to travel upon. Therefore, it represents where the user will most likely be when the calculation of the new solution route is complete.

After the new solution route has been calculated, the process loops back to the step (Step 410) at which the vehicle position is compared to the calculated route. When this step is performed, the new solution route is used instead of the original solution route. The off-route application 400 continues as described above The off-route method described herein provides the advantage that a prediction is made about where the vehicle will be when the calculation of the new route is complete. This prediction takes into account factors, such as the turn costs associated with successor road segments at intersections. By taking this information into account, a prediction where the vehicle will be is more likely to be correct. Following are several examples illustrating operation of the off-route application.

EXAMPLE 1

Figure 5A:
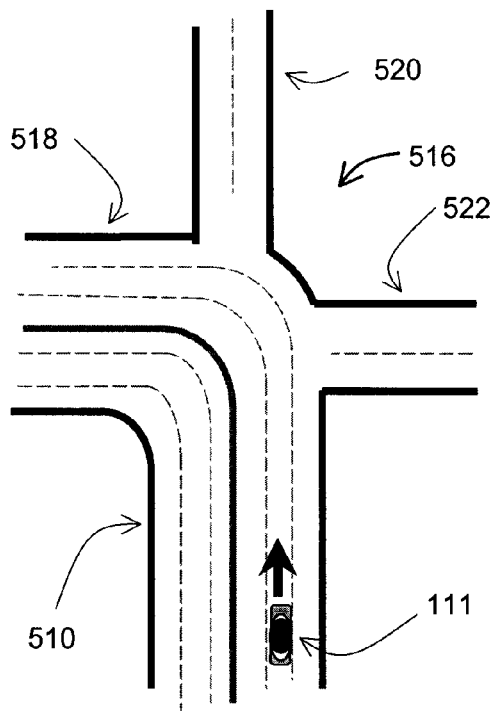
FIG. 5A depicts the vehicle of FIG. 1 approaching an intersection.

FIG. 5A shows the vehicle 111. The vehicle 111 includes the navigation system (110 in FIG. 3) with the off-route application (400 in FIG. 4). The vehicle 111 is located on a road segment 510 approaching an intersection 516. The road segment 510 is part of a major road that heads left at the intersection 516, forming the road segment 518. Also meeting the major road at the intersection 516 are minor roads 520 and 522. The minor road 520 continues straight ahead from the road segment 510 and the minor road 522 heads off to the right.

Figure 5B:
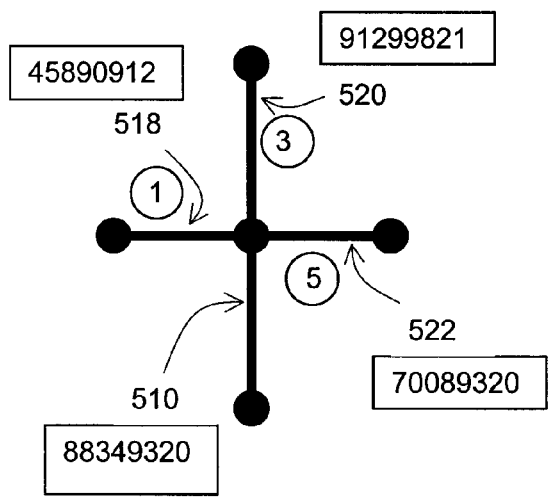
FIG. 5B is a graphical representation of the intersection shown in FIG. 5A.
Figure 5B:
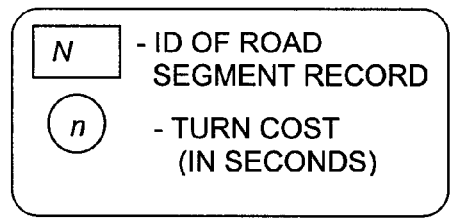

FIG. 5B is a graphical representation of the intersection 510. In FIG. 5B, the road segment 510 is assigned an ID of 88349320, the road segment 518 is assigned an ID of 45890912, the road segment 520 is assigned an ID of 91299821 and the road segment 522 is assigned an ID of 70089320. Associated with each turn from the segment 510 is a turn cost. The turn cost associated with the turn onto the road segment 518 is "1 second", the turn cost associated with the turn (i.e., actually a "straight ahead") onto the road segment 520 is "3 seconds", and the turn cost associated with the turn onto the road segment 522 is "5 seconds."

Figure 5C:
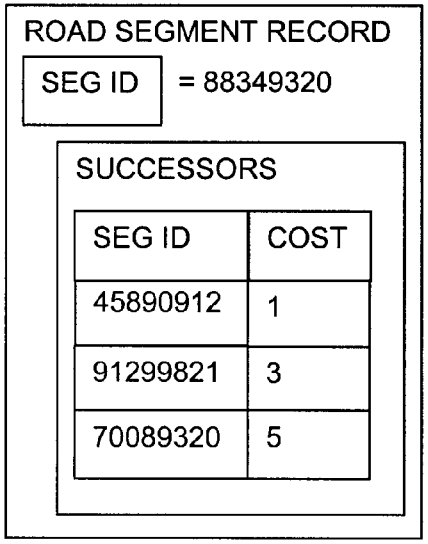
FIG. 5C shows how the turn costs of the intersection of FIG. 5A are represented in the geographic database of FIG. 2.

FIG. 5C illustrates components of a road segment data record (like the record 222 in FIG. 2) that represent the road segment 510. As shown in FIG. 5C, the successor segments are listed along with the turn costs associated with each successor segment.

If the vehicle 111 is determined to be off-route when it is at the location indicated in FIG. 5A, the off-route application 400 performs the steps shown in FIG. 4 to calculate a new route to the destination. The intersection 516 is determined to within the recalculation threshold. Then, the weighting factor is applied to the turn costs of the successor segments of the road segment 510 at the intersection 516. When the weighting factor is applied to the turn costs of the successor segments of segment 510, the resultant turn costs are "10 seconds", "30 seconds", and "50 seconds", respectively. Thus, when a new solution route is calculated, the left turn from segment 510 onto segment 518 is substantially favored over either turning right onto segment 522 or going straight onto segment 520. Therefore, the left turn onto segment 518 will likely be in the new solution route. The driver is also most likely to follow the main road and make a left turn onto segment 518. Therefore, the driver is likely to be on the solution route when calculation of the solution route is complete.

EXAMPLE 2

FIG. 6A shows the vehicle 111 located on a road segment 610. The road segment 610 is part of a controlled access road. An exit ramp 612 is located ahead of the vehicle 111 on the right. The controlled access road continues past the exit ramp 612 forming another road segment 614. Thus, the exit ramp 612 forms an intersection with the controlled access road formed of segments 610 and 614.

FIG. 6B is a graphical representation of the intersection shown in FIG. 6A. In FIG. 6B, the road segment 610 is assigned an ID of 22093120, the exit ramp 612 is assigned an ID of 99821912, and the road segment 614 is assigned an ID of 02274589. Associated with each path from the segment 610 is a turn cost. The turn cost associated with continuing on the controlled access road (i.e., continuing onto segment 614) is "1 second" and the turn cost associated with the turn onto the exit ramp 612 is "4 seconds."

FIG. 6C illustrates components of a road segment data record 222 that represent the road segment 610. As shown in FIG. 6C, the successor segments are listed along with the turn costs associated with each successor segment.

If the vehicle 111 is determined to be off-route when it is at the location indicated in FIG. 6A, the off-route application 400 performs the steps shown in FIG. 4 to calculate a new route to the destination. When the weighting factor is applied to the turn costs of the successor segments of the segment 610, the resultant turn costs are "10 seconds" and "40 seconds", respectively. Thus, when a new solution route is calculated, continuing on the controlled access road is substantially favored over turning onto the exit ramp 612. Therefore, continuing on the controlled access road will likely be in the new solution route. The driver is also most likely to stay on the controlled access road rather than turn onto the exit. Therefore, the driver is likely to be on the solution route when calculation of the solution route is complete.

EXAMPLE 3

Figure 7A:
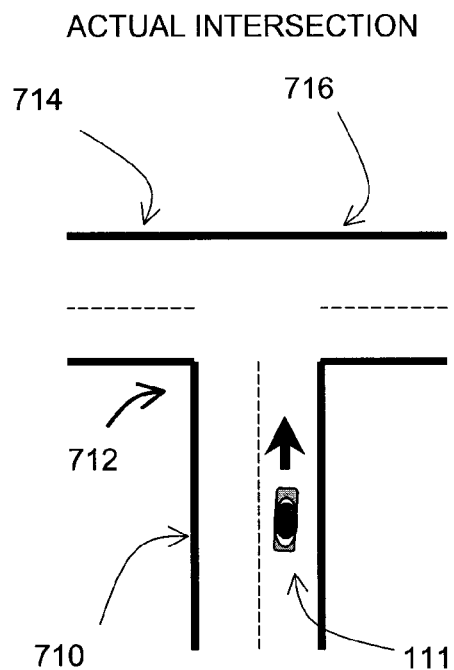
FIG. 7A depicts the vehicle of FIG. 1 approaching an intersection.

FIG. 7A shows the vehicle 111. The vehicle 111 is located on a road segment 710 approaching an intersection 712. The road segment 710 is part of a road that ends at the intersection 712 so that the vehicle has to turn either left onto the road segment 714 or right onto the road segment 716.

Figure 7B:
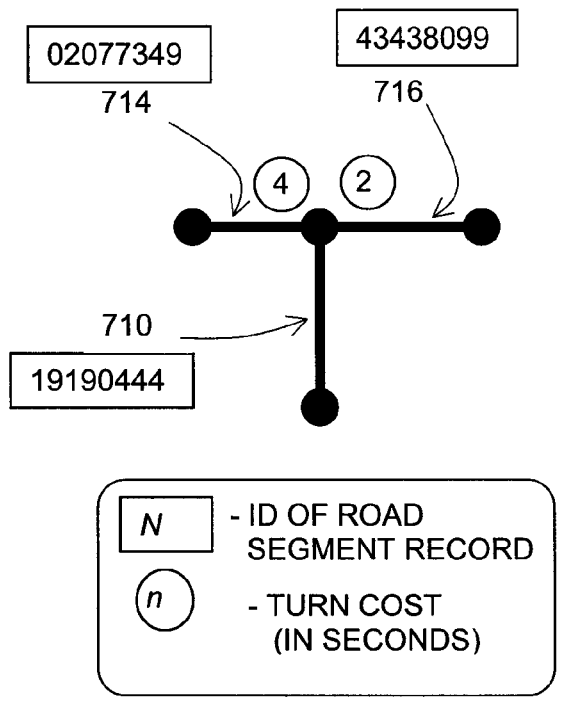
FIG. 7B is a graphical representation of the intersection shown in FIG. 7A.

FIG. 7B is a graphical representation of the intersection 710. In FIG. 7B, the road segment 710 is assigned an ID of 19190444, the road segment 714 is assigned an ID of 02077349, and the road segment 716 is assigned an ID of 43438099. Associated with each turn from the segment 710 is a turn cost. The turn cost associated with the turn onto the road segment 714 is "4 seconds" and the turn cost associated with the turn onto the road segment 716 is "2 seconds."

Figure 7C:
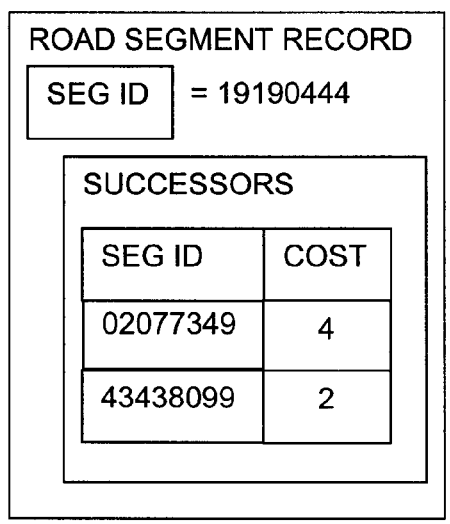
FIG. 7C shows how the turn costs of the intersection of FIG. 7A are represented in the geographic database of FIG. 2.

FIG. 7C illustrates components of a road segment data record 222 that represents the road segment 710. FIG. 7C indicates the successor segments and the associated turn costs.

If the vehicle 111 is determined to be off-route when it is at the location indicated in FIG. 7A, the off-route application 400 applies the weighting factor to the turn costs of the successor segments of segment 710. The resultant turn costs are "40 seconds" and "20 seconds", respectively. Thus, when a new solution route is calculated, the right turn from segment 718 onto segment 716 is substantially favored over the left turn onto the road segment 714. Therefore, the right turn onto the road segment 716 will likely be in the new solution route. The driver is also most likely to make a right onto the road segment 716. Therefore, the driver is likely to be on the solution route when calculation of the solution route is complete.

III. Alternatives

In the above described embodiments, it was stated that the turn costs associated with the successor segments were adjusted by multiplying each turn cost by a factor. In the disclosed embodiment, the factor was identified as 10. In alternative embodiments. the factor can be any number. It is preferable that the factor be sufficiently large so that the turn with the least cost is included in the solution route. In further alternatives, the turn costs can be adjusted by other means, such as by adding seconds to all the turn costs except the least turn cost.

It is intended that the foregoing detailed description be regarded as illustrative rather than limiting and that it is understood that the following claims including all equivalents are intended to define the scope of the invention.

I claim:

1. A method of providing guidance with a navigation system to a user of said navigation system when a vehicle in which the user is located deviates from a route to a destination for which route guidance was previously being provided by the navigation system, the method comprising the steps of:

upon detecting that the vehicle has deviated from the route for which the user had been receiving route guidance, calculating a new route to the destination from a current location of said vehicle;

wherein during said calculating step, for those intersections that can be encountered by said vehicle from said current position while said calculating is being performed, adjusting relative cost factors associated with paths leading from said intersections to increase a probability that the new route will include a path from the current position that the user is likely to take.

2. The method of claim 1 further comprising:

providing the user with guidance for following the new route.

3. The method of claim 1 wherein said step of relatively adjusting comprises:

multiplying a cost factor associated with each of said paths by a constant.

4. The method of claim 3 wherein said constant is 10.

5. The method of claim 1 wherein each of said cost factors is expressed in seconds associated with taking an associated path from an intersection.

6. The method of claim 1 wherein said cost factors are included in a geographic database used by the navigation system.

7. The method of claim 6 wherein said geographic database is installed in the vehicle.

8. A method of providing guidance with a navigation system to a user of the navigation system when a vehicle in which the user is located departs from a route to a destination for which route guidance was being provided by the navigation system, the method comprising the steps of:

identifying intersections within a threshold that can be reached by the vehicle while calculation of a new solution route to the destination is being performed;

predicting a most likely path that the vehicle will take from each of said identified intersections; and calculating a new solution route that includes the most likely path from each of said identified intersections.

9. The method of claim 8 wherein said step of predicting comprises:

adjusting turn costs associated with each path leading from said identified intersections.

10. The method of claim 9 wherein each of said turn costs is expressed in seconds.

11. The method of claim 9 wherein said turn costs are included in a geographic database used by the navigation system.

12. The method of claim 11 wherein said geographic database is installed in the vehicle.

13. The method of claim 8 further comprising:

providing the user with guidance for following the new solution route.

14. The method of claim 8 wherein said step of predicting comprises:

multiplying a cost factor associated with each path from each said identified intersections by a constant.

15. The method of claim 14 wherein said constant is 10.

16. A method of using a navigation system that uses a geographic database to predict where a vehicle will be after the vehicle has deviated from a first route to a destination for which route guidance was being provided by the navigation system, the method comprising the steps of:

identifying intersections that can be reached by the vehicle while calculation of a new solution route to the destination is being performed by the navigation system;

identifying turn costs associated with possible paths leading from each of said identified intersections, wherein said turn costs are included in the geographic database;

temporarily modifying said turn costs; and calculating a second route using said temporarily modified turn costs.

17. The method of claim 16 further comprising:

providing a user of the navigation system with guidance for following the second route.

18. The method of claim 16 wherein said step of temporarily modifying comprises:

multiplying said turn costs by a factor.

19. The method of claim 16 wherein said step of temporarily modifying comprises:

multiplying said turn costs by a relatively large number.

* * * * *